Patented Oct. 11, 1938

2,133,210

UNITED STATES PATENT OFFICE 2,133,210

METHOD OF MAKING HYDROGEN PEROXIDE FROM PERSALTS

Heinrich Schmidt, Walddorf, Germany, assignor to Pennsylvania Salt Manufacturing Company, Philadelphia, Pa., a corporation of Pennsylvania No Drawing. Application June 19, 1936, Serial No. 86,193. In Germany June 22, 1935

7 Claims. (Cl. 23—207)

The present invention relates to the distillation of solutions to obtain hydrogen peroxide, and more particularly it relates to a method by which the active oxygen of solutions of persalts or peracids may be recovered with a minimum of loss through decomposition.

The principal object of the present invention is to provide a process involving the distillation of persulphate solutions to obtain hydrogen peroxide, the use of which avoids the high losses in active oxygen usually encountered.

A further object of the invention is to furnish a flexible process by which the flow of the solution to the distillation apparatus and the concentration thereof can be increased, and the relative amount of heat supplied can be decreased, as compared to usual practices, even to the extent of permitting the crystallization of the persulphate during distillation.

Other objects will be apparent from a consideration of the specification and claims.

As is known, the preparation of hydrogen peroxide from solutions, such as those containing persulphuric acid, or the salts thereof, is difficult, and it is not possible to obtain theoretical yields. The tendency of the resulting peroxide to decompose increases as the concentration of the solution being distilled increases, and this decomposition proceeds rapidly as the concentration of the impurities increases. These harmful impurities or catalysts include platinum particles or colloidal platinum from the electrolytic cells which accumulate in the solution. A yield of 75% of the hydrogen peroxide present in the solution can be obtained, but if the distillation is carried further, increasing decomposition of the hydrogen peroxide is encountered. It has been proposed to reduce the concentration during the distillation by the addition of water in an attempt to overcome the disadvantage of high concentration, but this procedure results in only a very slight improvement in yield. Even when the greatest care is employed using this method of dilution, it is not possible to produce the peroxide without a loss. This method has also proved to be complicated and difficult, and the expense of the distillation step is increased thereby.

The process of the present invention contemplates the distillation of solutions of peracids or persalts, such as ammonium persulphate, interrupting the distillation before the maximum concentration of the residual liquor is reached, or before the maximum amount of active oxygen is removed as hydrogen peroxide, and then recovering the remainder of the active oxygen from the residue as a persalt. The persalt is separated from the residual liquor in solid form, and this may be accomplished by several methods. For example, a water-insoluble persalt may be formed by the addition of a salt which reacts with the soluble percompound causing precipitation of the insoluble product; the soluble persalt may be recovered by crystallization upon suitable cooling of the solution, after dilution if desired or necessary; or the soluble persalt may be crystallized by the addition of an inert soluble salt, such as ammonium bisulphate so that the substances removed from the liquors by crystallization are restored. The distillation may be interrupted at any time before the maximum amount of hydrogen peroxide is recovered therefrom, but in general the interruption will take place when 70% to 80% of the active oxygen of the solution has been removed therefrom.

The process is applicable for use in the distillation of solutions containing persalt or peracid, and the terms "persalt" and "persulphate" are employed herein to include solutions of the peracid as well as the persalt.

By proceeding as described, the detrimental impurities of the electrolyte which act as catalysts of decomposition are removed so that the renewal of the electrolyte is less frequent. For this reason, it is possible to operate for long periods of time with constant distillation yields. Practically no loss of active oxygen is incurred and an oxygen yield of over 95% in the form of peroxide and persalts results. The solution after the removal of the persulphate and impurities is preferably returned to the electrolytic cells for re-electrolysis; thus a cyclic process is available affording a very efficient cell operation.

By the process of the present invention, it is possible to recover the hydrogen peroxide and remaining active oxygen, with a high yield and without appreciable loss by decomposition, since the destructive action of impurities or catalysts is greatly reduced. Furthermore, the distillation can be carried out so that some of the persalt separates during the distillation, or if this causes inconvenience the flow of the solution to the distillation chamber be increased, and the relative amount of heat supplied can be reduced. Solutions with a higher salt or acid content can be distilled and the whole system becomes more flexible.

For example, as an example of operation according to prior practice if an acid solution of ammonium persulphate containing approximately 280 grams per litre of ammonium persulphate, 170 grams per litre of sulphuric acid, and 50 grams per litre of ammonium sulphate, the solution having been distilled and electrolyzed in a cyclic manner for some time, is distilled according to present practice, approximately 78% of the active oxygen in the solution is obtained as hydrogen peroxide, while in the residue after the distillation there remains 8% of hydrogen peroxide. The loss of oxygen by decomposition amounts to 14%.

If on the other hand, this distillation is repeated with a similar solution where the feed of the solution to the distilling chamber is increased without changing the other conditions and the distillation is conducted without any persulphate precipitation, substantially 73% of the active oxygen in the solution is obtained as hydrogen peroxide, the residue contains 24% of the original active oxygen content in the form of persulphate and the loss by decomposition is 3%. If the resulting liquid residue is diluted to half of the original volume of the liquid distilled, a persulphate solution results containing 135 grams per litre of ammonium persulphate. If to this solution 153 grams of potassium bisulphate are added, approximately 150 grams of potassium persulphate crystallizes out, and the ammonium persulphate in the residue falls to 6 grams per litre which equals 1.4% of the quantity originally employed. Thus from the persulphate solution, 73% is obtained as hydrogen peroxide and 22.8% as persulphate so that the total oxygen yield is 95.8%. It will be seen, therefore, that instead of attempting to recover all of the oxidizing value of the persulphate solution as hydrogen peroxide through distillation with an accompanying relatively large loss due to decomposition, the larger portion is recovered as hydrogen peroxide by distillation with a reasonably small decomposition loss, while a further portion of the oxidizing value is obtained by the formation of an insoluble persalt. Thus, the recovery of the useful oxidizing value of the original solution is more efficient.

If the residual liquor after removal of the persalt is brought up to its original strength by electrolysis, thereby replacing the substances which have been removed (by crystallization), and this solution is distilled again according to the known methods, the decomposition loss is about 3% less than the above, and the distillation operates more smoothly. In the event the persalt recovered by crystallization is ammonium persulphate, this salt may be added to the solution being distilled and thus a high peroxide yield may indirectly be obtained.

Considerable modification is possible in the distillation step, as well as in the methods employed in recovering the persalt in solid form without departing from the essential features of the invention.

I claim:

1. The steps in the method of distilling solutions containing persalts obtained by electrolytic oxidation to obtain hydrogen peroxide therefrom in a cyclic process which comprises distilling said solution and interrupting the distillation before the maximum yield of hydrogen peroxide is obtained therefrom and while there is an appreciable amount of persalt remaining in the solution undecomposed, treating the residual liquor to obtain at least a portion of the persalt remaining therein in solid form, separating the persalt from the solution, reoxidizing the residual solution by electrolysis, and thereafter distilling the reoxidized solution.

2. The steps in the method of distilling solutions containing ammonium persulphate obtained by electrolytic oxidation to obtain hydrogen peroxide therefrom in a cyclic process which comprises distilling said solution and interrupting the distillation before the maximum yield of hydrogen peroxide is obtained therefrom and while there is an appreciable amount of persulphate remaining in the solution undecomposed, treating the residual liquor to obtain at least a portion of the ammonium persulphate remaining therein in solid form, separating the ammonium persulphate from the solution, reoxidizing the residual solution by electrolysis, adding at least a portion of the recovered ammonium persulphate to the oxidized solution, and thereafter distilling the reoxidized solution.

3. The process of claim 1, wherein the distillation of the persulphate solution is interrupted when about 70%–80% of the active oxygen content of the solution has been recovered.

4. The process of claim 1 wherein the solution distilled contains a persulphate, and wherein a persulphate is recovered from the residual liquor in solid form.

5. The process of claim 2 wherein the distillation of the ammonium persulphate solution is interrupted when about 70%–80% of the active oxygen content of the solution has been recovered.

6. The steps in the method of distilling solutions containing persulphate obtained by electrolytic oxidation to obtain hydrogen peroxide therefrom in a cyclic process, which comprises distilling said solution and interrupting the distillation before the maximum yield of hydrogen peroxide is obtained and while there is an appreciable amount of persalt remaining in the solution undecomposed, removing the residual liquor containing undecomposed persulphate from the still, re-oxidizing the solution by electrolysis, and redistilling said electrolyzed solution.

7. The process of claim 6 wherein the distillation of the persulphate solution is interrupted when about 70%–80% of the active oxygen content of the solution has been recovered.

HEINRICH SCHMIDT.